(12) United States Patent
Takahashi (10) Patent No.: US 9,884,573 B2
(45) Date of Patent: Feb. 6, 2018

(54) HEADREST SUPPORTING STRUCTURE

(71) Applicant: TOYOTA JIDOSHA KABUSHIKI KAISHA, Toyota-shi (JP)

(72) Inventor: Gen Takahashi, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 38 days.

(21) Appl. No.: 14/787,557

(22) PCT Filed: Apr. 8, 2014

(86) PCT No.: PCT/JP2014/060219
§ 371 (c)(1),
(2) Date: Oct. 28, 2015

(87) PCT Pub. No.: WO2014/181628
PCT Pub. Date: Nov. 13, 2014

(65) Prior Publication Data
US 2016/0082869 A1    Mar. 24, 2016

(30) Foreign Application Priority Data
May 8, 2013  (JP) ................................ 2013-098514

(51) Int. Cl.
*B60N 2/48*  (2006.01)

(52) U.S. Cl.
CPC ............. *B60N 2/4838* (2013.01); *B60N 2/48* (2013.01); *B60N 2/4808* (2013.01); *B60N 2002/4897* (2013.01); *B60N 2205/20* (2013.01)

(58) Field of Classification Search
None
See application file for complete search history.

(56) References Cited

U.S. PATENT DOCUMENTS

| 5,080,437 A * | 1/1992 | Pesta ................... B60N 2/4817 248/408 |
| 2009/0261635 A1* | 10/2009 | Yamaguchi .......... B60N 2/4885 297/216.12 |

(Continued)

FOREIGN PATENT DOCUMENTS

| JP | 61-149552 U | 9/1986 |
| JP | 2011-207335 A | 10/2011 |
| WO | WO 2010150372 A1 * | 12/2010 ........... B60N 2/4228 |

OTHER PUBLICATIONS

International Search Report dated May 13, 2014 in PCT/JP14/060219 Filed Apr. 8, 2014.

*Primary Examiner* — David E Allred
(74) *Attorney, Agent, or Firm* — Oblon, McClelland, Maier & Neustadt, L.L.P.

(57) ABSTRACT

A headrest supporting structure is provided with a lower spring and an upper spring, which are located at different positions in the vertical direction of a seat. The structure elastically supports a headrest stay with the springs. When a stopper section, which changes the position in the front-back direction in accordance with pivoting of the headrest, comes into contact with a support bracket, further pivoting of the headrest is restricted. The stiffness of the upper spring located relatively distant from the stopper section in the seat vertical direction is higher than that of the lower spring located closer to the stopper section.

3 Claims, 9 Drawing Sheets

(56) References Cited

U.S. PATENT DOCUMENTS

| | | | |
|---|---|---|---|
| 2013/0127222 A1* | 5/2013 | Ishimoto | B60N 2/4838 297/404 |
| 2014/0354025 A1* | 12/2014 | Ishimoto | B60N 2/4885 297/408 |
| 2015/0145309 A1* | 5/2015 | Takahashi | B60N 2/4808 297/404 |
| 2015/0306994 A1* | 10/2015 | Kitou | B60N 2/4838 297/408 |
| 2016/0082869 A1* | 3/2016 | Takahashi | B60N 2/4808 297/404 |
| 2016/0166064 A1* | 6/2016 | Takahashi | B60N 2/4808 297/404 |

* cited by examiner

HEADREST SUPPORTING STRUCTURE

TECHNICAL FIELD

The present invention relates to a headrest supporting structure that elastically supports a headrest on a backrest.

BACKGROUND ART

To reduce the fuel consumption amount of vehicles, the engine rotational speed during idling of the engine has been reduced. As a result, the frequency band of engine vibration during idling includes the resonance frequency of the vehicle seat, which reduces the drivability. Seats have been developed that attenuate vibration in the seat front-rear direction by allowing the headrest to pivot with respect to the backrest in the front-rear direction when exciting force is transmitted to the seat.

Figure 10:
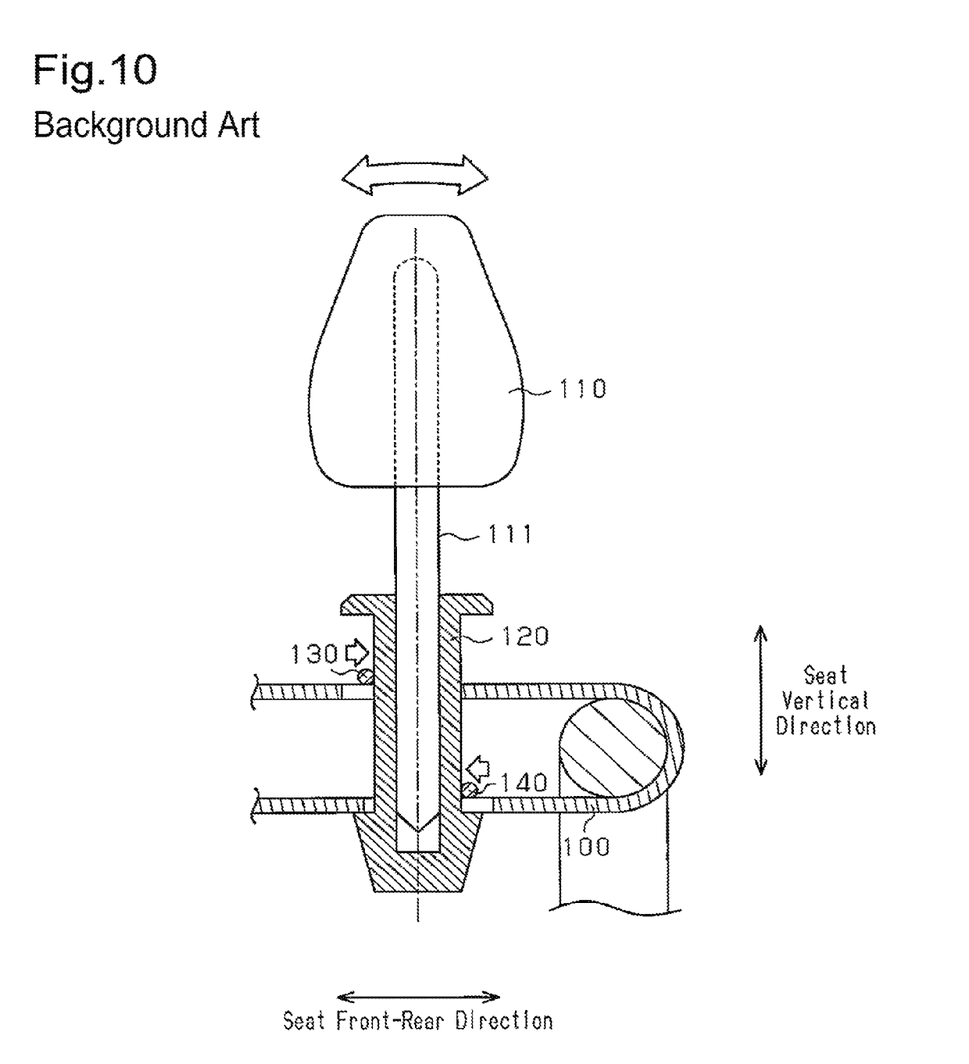
FIG. 10 is a cross-sectional side view of a headrest support and the surroundings in a conventional headrest supporting structure.

Patent Document 1 discloses one example of a headrest supporting structure that elastically supports the headrest on the backrest. As shown in FIG. 10, the supporting structure includes brackets 100 provided on the backrest and tubular support members 120 for supporting headrest stays 111, which project from a headrest 110. Each support member 120 is elastically supported on the associated bracket 100 with springs 130, 140 arranged at two different positions in the seat vertical direction. The headrest 110, which is elastically supported by the headrest supporting structure on the backrest, functions as the mass of a dynamic damper, and the springs 130, 140 of the headrest supporting structure function as springs of the dynamic damper.

When exciting force is transmitted to the seat that includes such a headrest supporting structure, each support member 120 tilts about the center of tilting between the springs 130, 140 in the seat vertical direction. The tilting of the support members 120 causes the headrest 110, which is supported on the support members 120 via the headrest stays 111, to tilt with respect to the backrest in the front-rear direction so that vibration of the seat is attenuated.

PRIOR ART DOCUMENT

Patent Document

Patent Document 1: Japanese Laid-Open Utility Model Publication No. 61-149552

SUMMARY OF THE INVENTION

Problems that the Invention is to Solve

The sizes and shapes of various components such as the headrest stays 111, the support members 120, and the brackets 100 vary within tolerance ranges. When such various components are assembled, assembly errors occur. Thus, due to individual differences of the headrest supporting structure, the allowable range of tilting of the support members 120 varies, and thus the allowable range of pivoting of the headrest 110 in the front-rear direction varies. As a result, the vibration attenuation property of the dynamic damper undesirably varies.

Accordingly, it is an objective of the present invention to provide a headrest supporting structure that reduces variation in the attenuation property of vibration generated in a seat by reducing variation in a pivot range of a headrest with respect to a backrest in the front-rear direction.

Means for Solving the Problems

To achieve the foregoing objective and in accordance with one aspect of the present invention, a headrest supporting structure is provided that supports a headrest on a backrest such that the headrest is capable of pivoting in a front-rear direction. The structure comprising, a bracket provided in the backrest, a first spring and a second spring, and a stopper section. The first spring and the second spring are located at two positions different from each other in a seat vertical direction. The first spring and the second spring elastically support a headrest stay, which projects from the headrest, with respect to the bracket. The stopper section is displaced in the front-rear direction in accordance with pivoting of the headrest. The stopper section restricts further pivoting of the headrest when abutting against the bracket. The first spring is more distant from the stopper section than the second spring in the seat vertical direction. The stiffness of the first spring is higher than the stiffness of the second spring.

In the above-described configuration, the bracket permits the headrest to pivot in the front-rear direction in a range in which the stopper section does not contact the bracket. When the headrest pivots in the front-rear direction, the headrest stay, which projects from the headrest, tilts with respect to the backrest about a predetermined center of tilting. The range in which the headrest is permitted to pivot in the front-rear direction is referred to as a pivot range, and the range in which the headrest stay is permitted to tilt with respect to the backrest is referred to as a tilt range.

In the above-described headrest supporting structure, the first spring, which has a stiffness higher than that of the second spring, is located more distant from the stopper section in the seat vertical direction than the second spring. Thus, as compared to a case in which the stiffnesses of the springs are the same, the above-described center of tilting is set to a position distant from the stopper section. In this case, if the width of the pivot range of the headrest is the same, the tilt range of the headrest stay is increased by an amount corresponding to the increase in the range in which the displacement of the stopper section in the front-rear direction is permitted as compared to the case in which the stiffnesses of the springs are the same. Thus, even if the width of the tilt range is changed due to errors in the sizes and the shapes of the headrest stay and various components that configure the headrest supporting structure and assembly errors in various components, the ratio of the change amount in the width of the pivot range of the headrest to the change amount in the width of the tilt range is reduced. That is, the width of the pivot range is kept from being easily changed. Thus, variation in the width of the pivot range of the headrest is reduced, and variation in the attenuation property of vibration generated in the seat is reduced.

The above-described headrest supporting structure may include a support member that includes a tubular portion, which receives the headrest stay, and supports the headrest stay inserted in the tubular portion. In this case, the stopper section is provided in the support member, and the bracket is configured to elastically support the headrest stay via the support member. The first spring expands and contracts in accordance with the displacement of the support member with respect to the bracket. Thus, when the support member tilts with the headrest stay, the first spring expands and contracts.

The stopper section may be located at a position more distant from the headrest in the seat vertical direction than the springs. In this case, the first spring, which has a high stiffness, is arranged in the vicinity of the headrest in the seat vertical direction, and the second spring, which has a stiffness lower than that of the first spring, is arranged distant from the headrest in the seat vertical direction. Thus, the headrest stay tilts about the center of tilting set closer to the headrest than the center between the springs. With this configuration, even if the initial position of the distal end of the headrest stay is displaced forward or rearward, the width of the pivot range of the headrest in the front-rear direction is less easily changed than in which the stiffnesses of the springs are the same. Thus, variation in the attenuation property of vibration generated in the seat can be reduced. The term "the initial position of the distal end of the headrest stay" refers to the position of the distal end of the headrest stay in the front-rear direction when the headrest does not receive any force.

To achieve the foregoing objective and in accordance with another aspect of the present invention a headrest supporting structure is provided that supports a headrest on a backrest such that the headrest is capable of pivoting in a front-rear direction. The structure includes a bracket provided in the backrest, a first spring and a second spring, and a stopper section. The first spring and the second spring are located at two positions different from each other in a seat vertical direction. The first spring and the second spring elastically support a headrest stay, which projects from the headrest, with respect to the bracket. The stopper section is displaced in the front-rear direction in accordance with pivoting of the headrest, wherein the stopper section restricts further pivoting of the headrest when abutting against the bracket. The headrest supporting structure is configured to allow the headrest stay to tilt about a center of tilting with respect to the bracket in accordance with pivoting of the headrest in the front-rear direction and to set the center of tilting at a position more distant from the stopper section than a center between the first and second springs in the seat vertical direction.

According to the above configuration, the center of tilting is set at a position distant from the stopper section by a relatively great distance in the seat vertical direction. In this case, if the width of the pivot range of the headrest is the same, the tilt range of the headrest stay is increased by an amount corresponding to the increase in the range in which the displacement of the stopper section in the front-rear direction is permitted as compared to a case in which the stiffnesses of the springs are the same. Thus, even if the width of the tilt range is changed due to errors in the sizes and the shapes of the headrest stay and various components that configure the headrest supporting structure and assembly errors in various components, the ratio of the change amount in the width of the pivot range of the headrest to the change amount in the width of the tilt range is reduced. That is, the width of the pivot range is kept from being easily changed. Thus, variation in the width of the pivot range of the headrest is reduced, and variation in the attenuation property of vibration generated in the seat is reduced.

MODES FOR CARRYING OUT THE INVENTION

First Embodiment

A headrest supporting structure according to a first embodiment applied to a seat installed in a vehicle will now be described with reference to FIGS. 1 to 6. In the present embodiment, the side of the headrest on which the head portion of a person seated in the seat is located is referred to as a front side, and the opposite side is referred to as a rear side. Furthermore, the direction in which the backrest and the headrest are arranged is referred to as a seat vertical direction.

Figure 1:
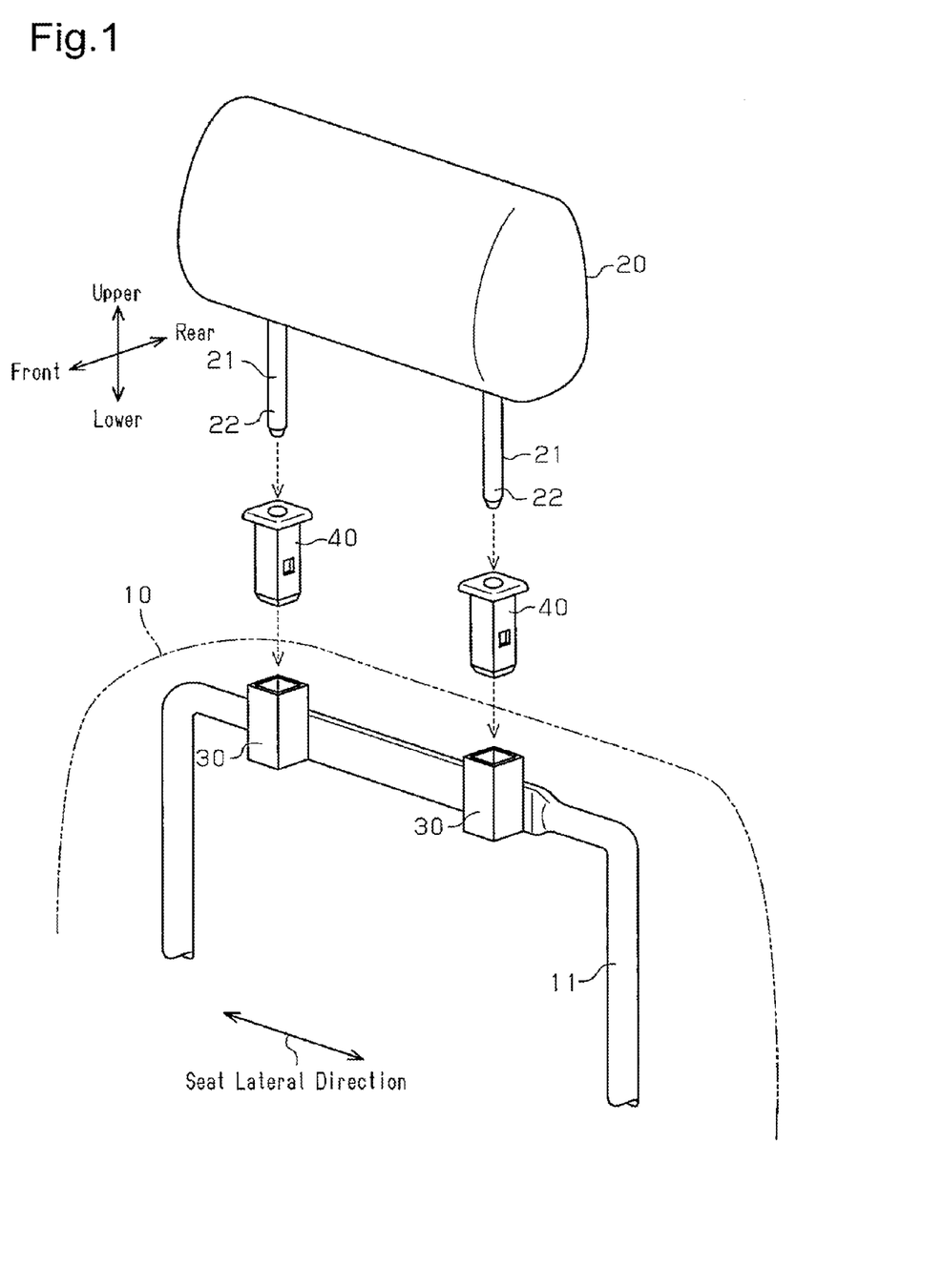
FIG. 1 is an exploded perspective view of a headrest supporting structure according to a first embodiment.

FIG. 1 shows a headrest supporting structure, which elastically supports a headrest 20 on a backrest 10 of the seat. As shown in FIG. 1, the headrest 20 includes a pair of rod-like headrest stays 21. The headrest stays 21 are arranged in the lateral direction of the seat, and each headrest stay 21 has a distal end portion 22, which projects from the headrest 20 toward the backrest 10.

The headrest supporting structure includes a pair of support brackets 30, which is formed of metal into a rectangular tube, and a pair of headrest supports 40 formed of plastic. The support brackets 30 are arranged with a gap in the seat lateral direction and are secured to the upper section of a backrest frame 11 by welding or fusion bonding.

Figure 2:
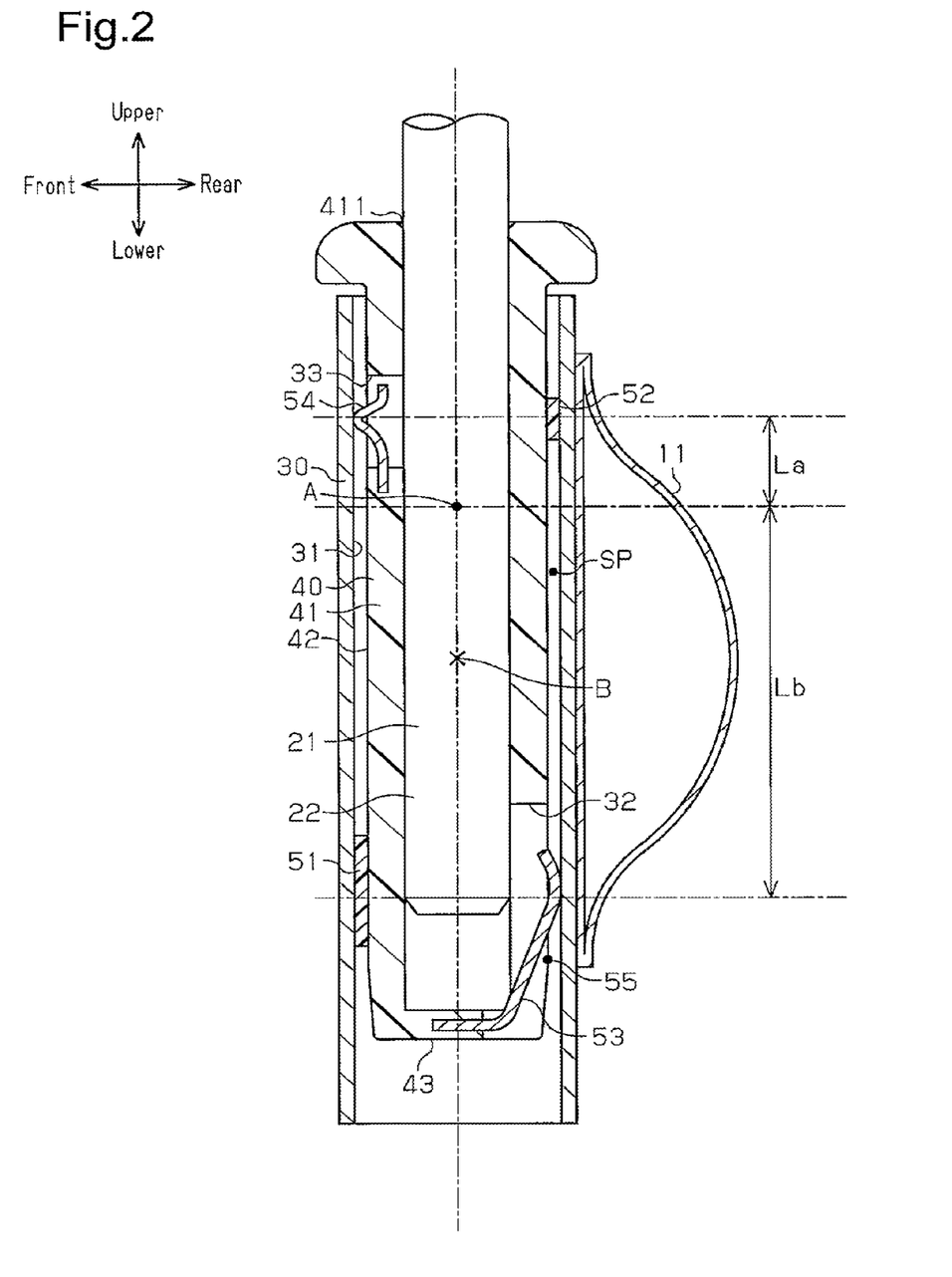
FIG. 2 is a cross-sectional side view of a headrest support and the surroundings in the headrest supporting structure of the first embodiment.

As shown in FIGS. 1 and 2, the headrest supports 40 are supported by the support brackets 30 with each headrest support 40 inserted in the associated support bracket 30 from the upper opening. Such a headrest support 40 is substantially cup shaped, and the distal end portion 22 of each headrest stay 21 is inserted in a tubular portion 41 of the associated headrest support 40 from the upper opening 411. The headrest supports 40 support the headrest 20 via the distal end portions 22 of the headrest stays 21 inserted in the tubular portions 41. Thus, in the headrest supporting structure of the present embodiment, the headrest supports 40 function as support members.

A space SP for allowing displacement (tilting) of the headrest support 40 in the seat front-rear direction is provided between an outer surface 42 of the tubular portion 41 of the headrest support 40 and an inner surface 31 of the support bracket 30. A first bead 51, which fills the space between the inner surface 31 of the support bracket 30 and the outer surface 42 of the tubular portion 41 of the headrest support 40, is provided on the lower front side of the headrest support 40. Furthermore, a second bead 52, which fills the space between the inner surface 31 of the support bracket 30 and the outer surface 42 of the tubular portion 41 of the headrest support 40, is provided on the upper rear side of the headrest support 40. The beads 51, 52 are formed of plastic that is the same as the headrest support 40. The beads 51, 52 may be formed integrally with each headrest support 40 or may be formed separately and secured to the headrest support 40 by adhesion.

Furthermore, a first communication window 32, which connects the inside and the outside of the headrest support 40, is provided on the lower rear side of the headrest support 40, which is opposite to the first bead 51 with respect to the distal end portion 22 of the headrest stay 21. Likewise, a second communication window 33, which connects the inside and the outside of the headrest support 40, is provided on the upper front side of the headrest support 40, which is opposite to the second bead 52 with respect to the distal end portion 22 of the headrest stay 21.

Furthermore, each headrest support 40 supports a lower spring 53 and an upper spring 54, which are arranged at different positions from each other in the seat vertical direction. The springs 53, 54 are metal leaf springs. The lower end of the lower spring 53 is supported by a bottom wall 43 at the lower section of the substantially tubular headrest support 40, and the lower spring 53 extends from the bottom wall 43 obliquely upward and rearward. Part of the lower spring 53 that projects toward the rear of the seat from the first communication window 32 contacts the inner surface 31 on the lower rear side of the support bracket 30. The lower spring 53 applies urging force to the support bracket 30 in a direction to increase the space between the outer surface 42 on the lower rear side of the tubular portion 41 of the headrest support 40 and the inner surface 31 on the lower rear side of the support bracket 30. That is, the lower spring 53 expands and contracts (elastically deforms) in accordance with the size of the space between the outer surface 42 on the lower rear side of the tubular portion 41 of the headrest support 40 and the inner surface 31 on the lower rear side of the support bracket 30.

The upper spring 54 is a cantilever spring, which has a lower end serving as a secured end and an upper end serving as a free end, and is located in the second communication window 33. Part of the upper spring 54 projects forward from the second communication window 33. The part of the upper spring 54 that projects forward form the second communication window 33 contacts the inner surface 31 on the upper front side of the support bracket 30. The upper spring 54 applies urging force to the support bracket 30 in a direction to increase the space between the outer surface 42 on the upper front side of the tubular portion 41 of the headrest support 40 and the inner surface 31 on the upper front side of the support bracket 30. That is, the upper spring 54 expands and contracts (elastically deforms) in accordance with the size of the space between the outer surface 42 on the upper front side of the tubular portion 41 of the headrest support 40 and the inner surface 31 on the upper front side of the support bracket 30.

Figure 3:
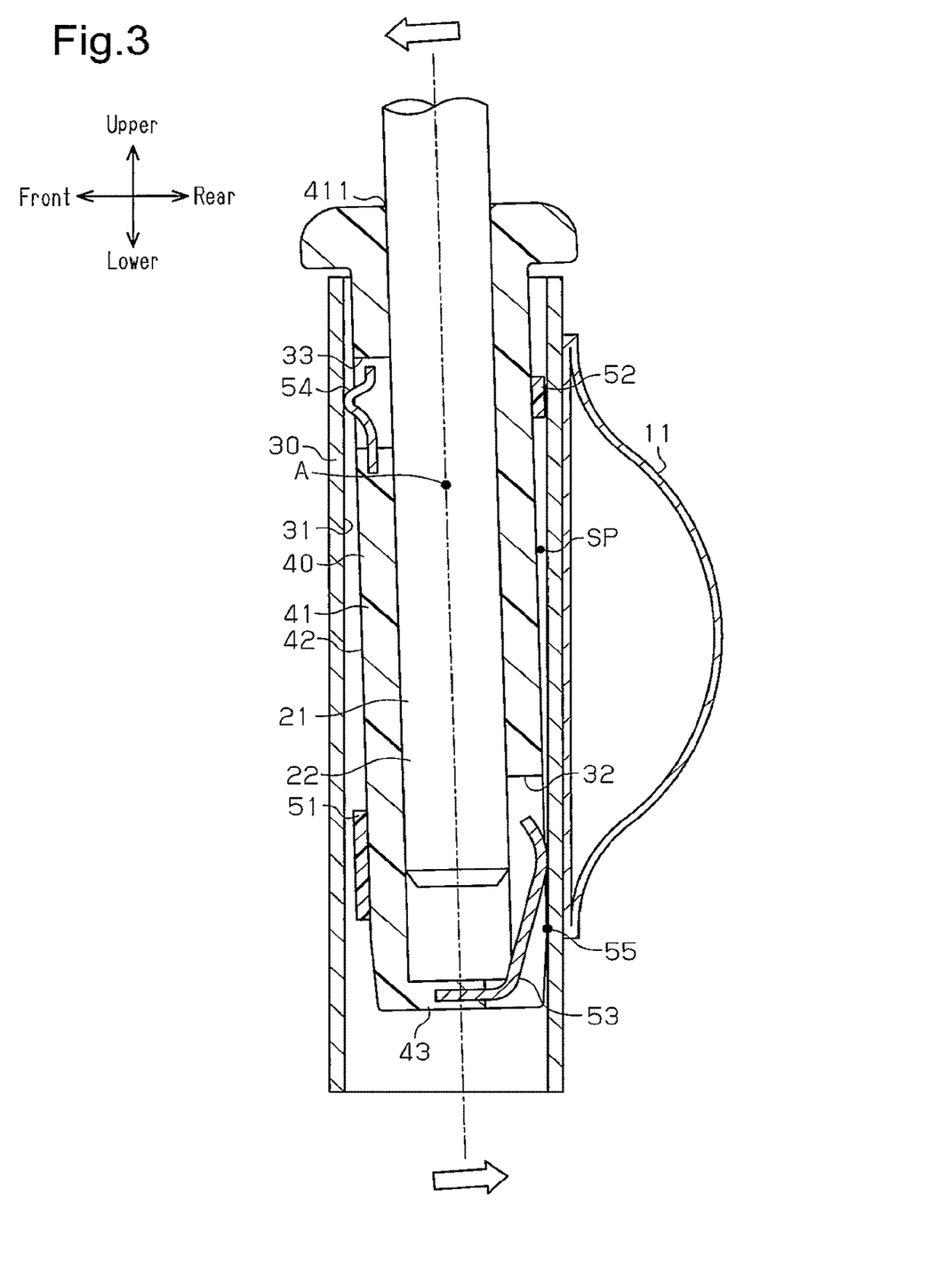
FIG. 3 is a cross-sectional side view of the headrest support and the surroundings when the headrest is displaced toward the front of the seat.

When exciting force is transmitted to the seat, each headrest stay 21 tilts with respect to the associated support bracket 30 about a center of tilting A between the springs 53, 54 in the seat vertical direction as shown in FIGS. 2 and 3, and the headrest 20 pivots in the seat front-rear direction. As a result, vibration of the seat is attenuated. That is, the springs 53, 54 function as springs of the dynamic damper, and the headrest 20 functions as the mass of the dynamic damper.

In the headrest supporting structure of the present embodiment, the stiffness of the upper spring 54 is higher than that of the lower spring 53. The upper spring 54 corresponds to a first spring, and the lower spring 53 corresponds to a second spring. Thus, the center of tilting A of the headrest stay 21 with respect to the support bracket 30 is located above a center position B between the upper spring 54 and the lower spring 53 in the seat vertical direction (in other words, the center position B, which is between the position at which the upper spring 54 contacts the support bracket 30 and the position at which the lower spring 53 contacts the support bracket 30). Thus, the length La from the position at which the upper spring 54 contacts the support bracket 30 to the center of tilting A is shorter than the length Lb from the position at which the lower spring 53 contacts the support bracket 30 to the center of tilting A.

When the headrest stay 21 tilts about the above-described center of tilting A, the headrest support 40, which supports the headrest stay 21, also tilts in accordance with the tilting of the headrest stay 21. For example, when each headrest stay 21 tilts such that the headrest 20 is displaced toward the front of the seat, the upper end of the headrest support 40 moves toward the front of the seat, and the lower end of the headrest support 40 moves toward the rear of the seat. When each headrest stay 21 tilts such that the headrest 20 is displaced toward the rear of the seat, the upper end of the headrest support 40 moves toward the rear of the seat, and the lower end of the headrest support 40 moves toward the front of the seat.

When the upper end of the headrest support 40 moves toward the front of the seat and the lower end of the headrest support 40 moves toward the rear of the seat, a stopper section 55, which is provided on the lower rear side of the headrest support 40, contacts the inner surface 31 on the lower rear side of the support bracket 30. In this case, abutment of the stopper section 55 against the support bracket 30 restricts further displacement of the headrest support 40, that is, further displacement of the headrest 20 toward the front of the seat. The position of the headrest 20 in the front-rear direction when force is not transmitted to the headrest 20 is referred to as an initial position, and the position of the headrest 20 in the front-rear direction when the stopper section 55 contacts the support bracket 30 is referred to as a maximum displacement position. In this case, the range from the initial position of the headrest 20 to the maximum displacement position is referred to a pivot range of the headrest 20.

That is, when the headrest support 40 and the headrest stay 21 tilt, part of the headrest support 40 or the headrest stay 21 that contacts the support bracket 30 functions as the stopper section 55. When the stopper section 55 contacts the support bracket 30 as described above, the headrest 20 is restricted from further pivoting. The upper spring 54 is located more distant from the stopper section 55 in the seat vertical direction than the lower spring 53. In other words, the position at which the upper spring 54 contacts the support bracket 30 is more distant from the stopper section 55 in the seat vertical direction than the position at which the lower spring 53 contacts the support bracket 30.

Operation of the headrest supporting structure according to the present embodiment will now be described with reference to FIG. 4.

When the headrest 20 is displaced toward the front of the seat, the headrest stays 21 tilt in accordance with the displacement. Subsequently, each headrest support 40, which supports the distal end portion 22 of the associated headrest stay 21, tilts with respect to the associated support bracket 30 together with the headrest stay 21. Thus, the upper spring 54 and the lower spring 53 apply urging force that acts in a direction opposite to the tilt direction to the headrest support 40.

As described above, since the upper spring 54 and the lower spring 53, which are arranged at positions different from each other in the seat vertical direction, expand and contract (elastically deform), the headrest stay 21 tilts with respect to the support bracket 30 about the above-mentioned center of tilting A, which is located above the center position B between the springs 53, 54 in the seat vertical direction. At this time, when the amount of displacement of the headrest 20 toward the front of the seat reaches a certain amount, that is, when the headrest 20 reaches the maximum displacement position, the stopper section 55 contacts the inner surface 31 on the lower rear side of the support bracket 30 so that the headrest stay 21 is restricted from further tilting. Thus, further displacement of the headrest 20 toward the front of the seat is performed by elastic deformation of the headrest stays 21.

When the headrest 20 is displaced toward the rear of the seat from the initial position, tilting of each headrest support 40 with respect to the associated support bracket 30 is restricted from the beginning by the abutment of the first bead 51 against the inner surface 31 on the lower front side of the support bracket 30 and the abutment of the second bead 52 against the inner surface 31 on the upper rear side of the support bracket 30. Thus, the displacement of the headrest 20 toward the rear of the seat is performed by elastic deformation of, for example, the headrest stays 21 from the beginning.

Figure 4:
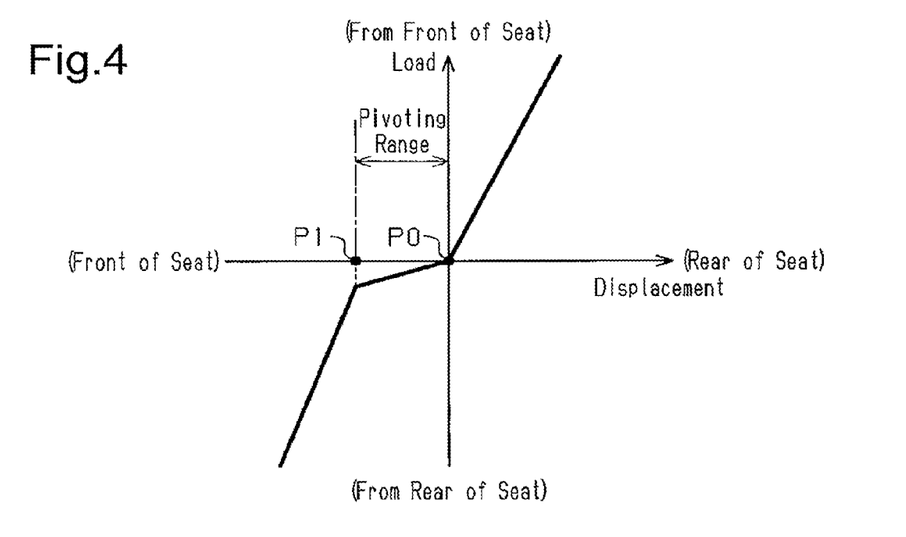
FIG. 4 is a graph showing the relationship between the displacement of the headrest and load required for such displacement.

The relationship between the displacement amount of the headrest 20 in the seat front-rear direction and load required for the displacement is as shown in FIG. 4.

That is, as shown in FIG. 4, a zone in which the support stiffness of the headrest 20 is small is set for displacement toward the front of the seat from the position where the displacement amount is zero, that is, from the initial position P0 of the headrest 20 when no external force is applied. However, the support stiffness of the headrest 20 is great for displacement toward the front of the seat after the headrest 20 reaches the maximum displacement position P1 and for displacement toward the rear of the seat from the initial position P0. That is, in the seat equipped with the headrest supporting structure of the present embodiment, pivoting (vibration) of the headrest 20 in the seat front-rear direction with respect to the backrest frame 11 is permitted in a range in which each stopper section 55 does not contact the inner surface 31 of the associated support bracket 30. Thus, when exciting force is transmitted from the vehicle body to the seat, generating vibration in the front-rear direction in the seat, the headrest 20 pivots in the front-rear direction within the pivot range so that vibration of the seat is attenuated.

However, when the vehicle is hit from the rear, the head portion of the occupant seated in the seat is reliably received by the headrest 20 since the structure has a high support stiffness against the displacement of the headrest 20 toward the rear of the seat.

Figure 5A:
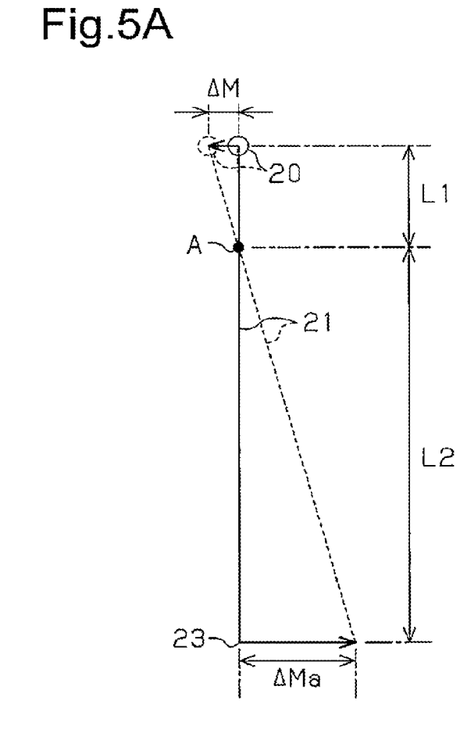
FIG. 5A is a schematic diagram illustrating a state in which the headrest is displaced toward the front of the seat in the headrest supporting structure of the first embodiment.
Figure 5B:
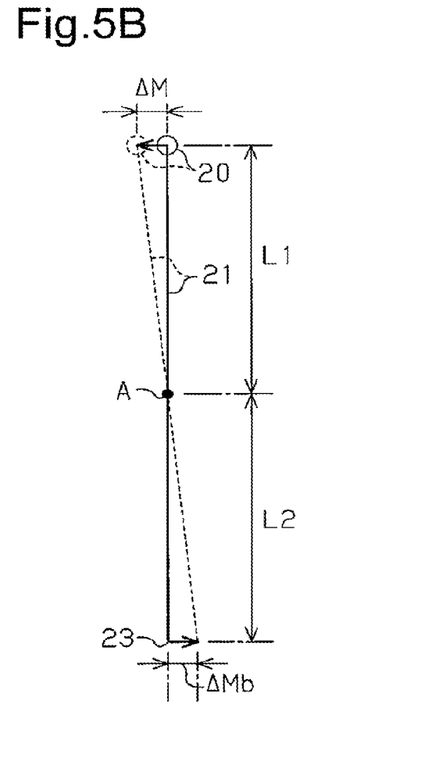
FIG. 5B is a schematic diagram illustrating a state in which the headrest is displaced toward the front of the seat in a headrest supporting structure of a comparative example.
Figure 6A:
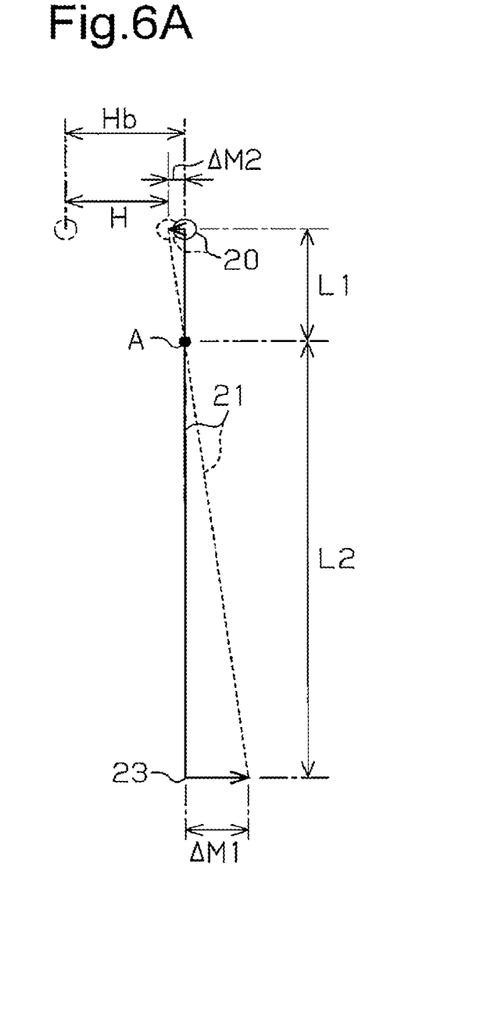
FIG. 6A is a schematic diagram illustrating a state in which the initial position of the distal end of the headrest stay is displaced toward the rear of the seat in the headrest supporting structure of the first embodiment.
Figure 6B:
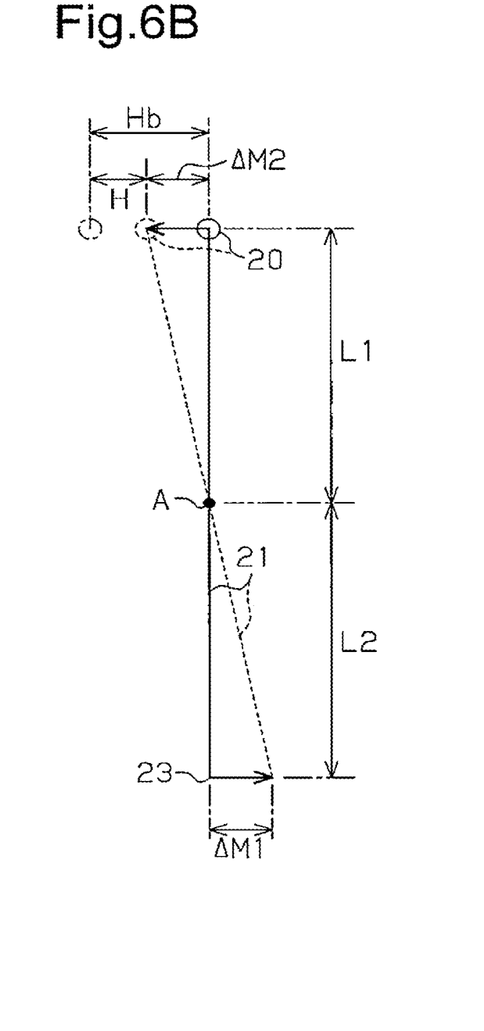
FIG. 6B is a schematic diagram illustrating a state in which the initial position of the distal end of the headrest stay is displaced toward the rear of the seat in the headrest supporting structure of the comparative example.

Operation when mounting the headrest 20 on the backrest 10 will now be described with reference to FIGS. 5A to 6B. FIGS. 5A and 6A show simplified models of the headrest supporting structure of the present embodiment in which the stiffness of the upper spring 54 is higher than that of the lower spring 53, and FIGS. 5B and 6B show simplified models of the headrest supporting structure of a comparative example in which the stiffness of the upper spring is equal to that of the lower spring.

As shown in FIG. 5A, in the headrest supporting structure of the present embodiment, since the stiffness of the upper spring 54 is higher than that of the lower spring 53, the center of tilting A of the headrest stay 21 is located above the center position B between the springs 53, 54 in the seat vertical direction. In contrast, as shown in FIG. 5B, in the headrest supporting structure of the comparative example, since the stiffness of the upper spring 54 is equal to that of the lower spring 53, the center of tilting A of the headrest stay 21 substantially matches with the center position B between the springs 53, 54 in the seat vertical direction.

In the headrest supporting structure of the present embodiment, the length L1 from the headrest 20 to the center of tilting A is shorter than that in the case of the headrest supporting structure of the comparative example. The length L2 from the center of tilting A to the distal end 23 of the headrest stay 21 is longer than that in the case of the headrest supporting structure of the comparative example. As a result, when the headrest 20 is displaced toward the front of the seat by a predetermined displacement amount ΔM, a displacement amount ΔMa of the distal end 23 of the headrest stay 21 toward the rear of the seat in the headrest supporting structure of the present embodiment is greater than a displacement amount ΔMb in the headrest supporting structure of the comparative example. Thus, the sizes and the shapes of the headrest support 40 and the support bracket 30 are designed such that the distal end 23 of the headrest stay 21 can be greatly displaced toward the rear of the seat in the headrest supporting structure of the present embodiment as compared to the case of the supporting structure of the comparative example when the pivot range of the headrest 20 in the seat front-rear direction is set to a predetermined width.

However, the sizes and the shapes of various components such as the headrest supports 40, the support brackets 30, and the headrest stays 21, which form the headrest supporting structure, vary to some extent within the tolerance range. Furthermore, when the seat is manufactured by assembling the above-described various components, certain assembly errors may occur.

As shown by broken line in FIGS. 6A, 6B, assume that the headrest 20 is supported by the headrest supporting structure with the initial position of the distal end 23 of the headrest stay 21 displaced toward the rear of the seat by a predetermined amount ΔM1 due to, for example, the above-described errors. The term "the initial position of the distal end 23 of the headrest stay 21" refers to the position of the distal end 23 of the headrest stay 21 in the seat front-rear direction when no external force is applied to the headrest 20. In this case, the initial position of the headrest 20 is displaced toward the front of the seat by a displacement amount ΔM2. The displacement amount ΔM2 is represented by the following relational expression (expression 1).

$$\Delta M2 = \Delta M1 \times (L1/L2)$$ (expression 1)

In the headrest supporting structure of the present embodiment, the length L1 from the headrest 20 to the center of tilting A is short, and the length L2 from the above-described center of tilting A to the distal end 23 of the headrest stay 21 is long as compared to the supporting structure of the comparative example. Thus, the displacement amount ΔM2 of the headrest 20 is less than that in the case of the supporting structure of the comparative example. Thus, when the designed width of the pivot range of the headrest 20 in the seat front-rear direction is represented by Hb, the actual width of the pivot range H(=HB−ΔM2) in the headrest supporting structure of the present embodiment is wider than that in the case of the supporting structure of the comparative example. That is, separating the above-described center of tilting A from the stopper section 55 and bringing it closer to the headrest 20 reduce the influence of the positional displacement of the distal end 23 of the headrest stay 21 in the seat front-rear direction on the width H of the pivot range of the headrest 20 in the front-rear direction.

The above described configuration and operation have the following advantages.

(1) In the headrest supporting structure of the present embodiment, the stiffness of the upper spring 54, which is located apart from the stopper section 55 by a relatively great distance in the seat vertical direction, is set higher than the stiffness of the lower spring 53, which is located in the vicinity of the stopper section 55 in the seat vertical direction. Thus, as compared to the case in which the stiffnesses of the springs 53, 54 are substantially the same, the above-described center of tilting A is set at the position distant from the stopper section 55. Accordingly, even if the initial position of the distal end 23 of the headrest stay 21 is changed, the width H of the pivot range of the headrest 20 is kept from being easily changed. Thus, variation in the width H of the pivot range of the headrest 20 is reduced, and variation in the attenuation property of vibration generated in the seat is reduced.

Second Embodiment

A headrest supporting structure according to a second embodiment will now be described with reference to FIG. 7. In the following description, differences from the headrest supporting structure of the first embodiment will mainly be discussed. Like or the same reference numerals are given to those components that are like or the same as the corresponding components of the headrest supporting structure of the first embodiment, and detailed explanations are omitted.

Figure 7:
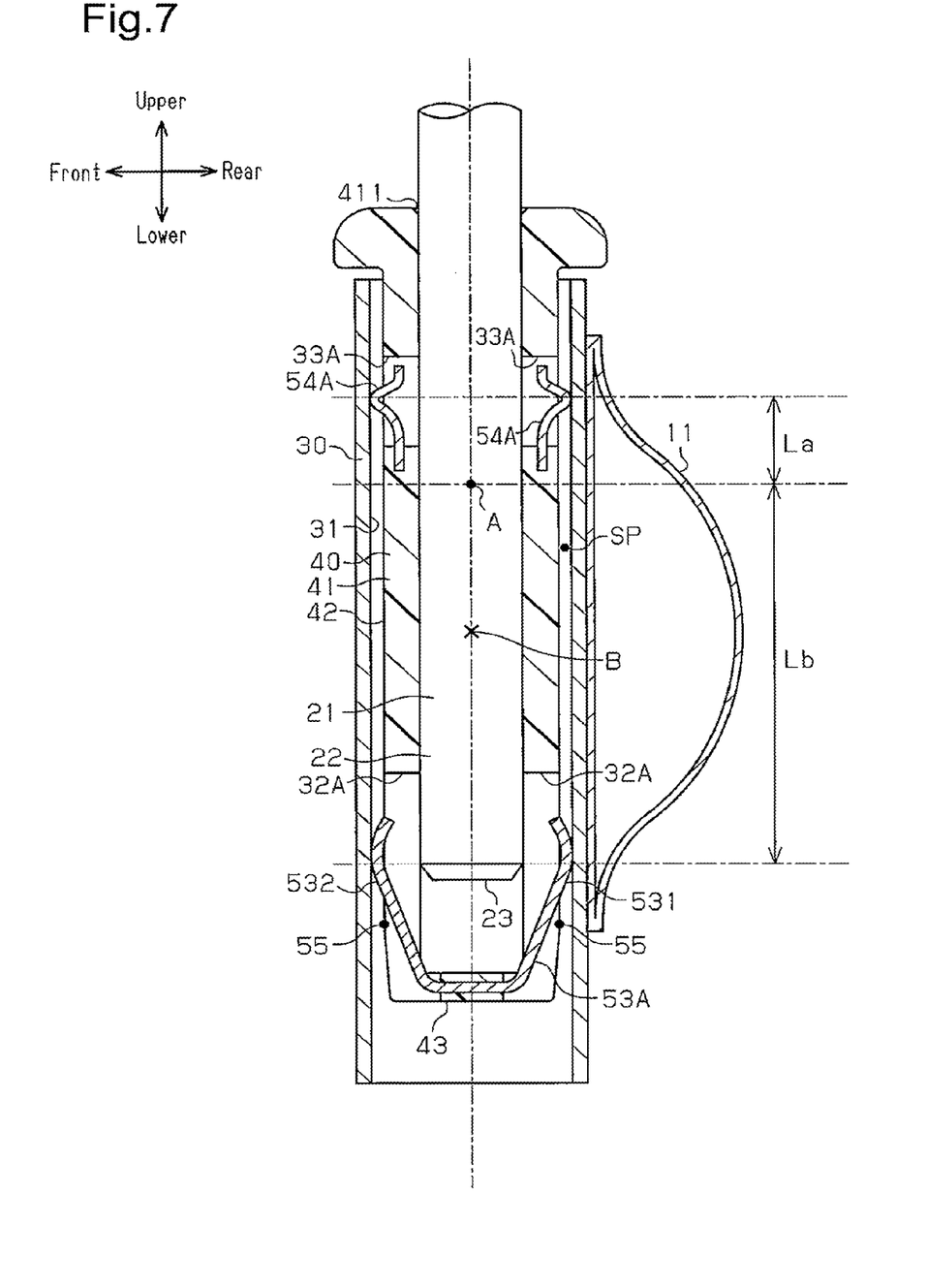
FIG. 7 is a cross-sectional side view of a headrest support and the surroundings in the headrest supporting structure according to a second embodiment.

As shown in FIG. 7, first communication windows 32A, which connect the inside and the outside of the headrest support 40, are provided on the lower rear side and the lower front side of the headrest support 40. A lower spring 53A, which is supported by the bottom wall 43 of the substantially tubular headrest support 40, has a first urging portion 531, which extends obliquely upward and rearward from the bottom wall 43, and a second urging portion 532, which extends obliquely upward and forward from the bottom wall 43. In the headrest supporting structure of the present embodiment, the stiffness of the first urging portion 531 and the stiffness of the second urging portion 532 are the same.

Most part of the first urging portion 531 is located inside the first communication window 32A that is provided on the lower rear side of the headrest support 40, and part of the first urging portion 531 that projects from the first communication window 32A toward the rear of the seat abuts against the inner surface 31 on the lower rear side of the support bracket 30. The first urging portion 531 applies urging force to the support bracket 30 in a direction to increase the space between the outer surface 42 on the lower rear side of the tubular portion 41 of the headrest support 40 and the inner surface 31 on the lower rear side of the support bracket 30.

Furthermore, most part of the second urging portion 532 is located inside the first communication window 32A that is provided on the lower front side of the headrest support 40, and part of the second urging portion 532 that projects from the first communication window 32A toward the front of the seat abuts against the inner surface 31 of the lower front side of the support bracket 30. The second urging portion 532 applies urging force to the support bracket 30 in a direction to increase the space between the outer surface 42 on the lower front side of the tubular portion 41 of the headrest support 40 and the inner surface 31 on the lower front side of the support bracket 30.

Furthermore, second communication windows 33A, which connect the inside and the outside of the headrest support 40, are provided on the upper front side and the upper rear side of the headrest support 40. Upper springs 54A, which urge the distal end portion 22 of the headrest stay 21, are provided inside the second communication windows 33A, and part of each upper spring 54A projects outside from the associated second communication window 33A. Part of each upper spring 54A that projects outside from the associated second communication window 33A abuts against the inner surface 31 of the support bracket 30. That is, the upper spring 54A located at the front side of the seat abuts against the inner surface 31 on the upper front side of the support bracket 30 and applies urging force to the support bracket 30 in a direction to increase the space between the outer surface 42 on the upper front side of the tubular portion 41 of the headrest support 40 and the inner surface 31 on the upper front side of the support bracket 30. Furthermore, the upper spring 54A located at the rear side of the seat abuts against the inner surface 31 on the upper rear side of the support bracket 30 and applies urging force to the support bracket 30 in a direction to increase the space between the outer surface 42 on the upper rear side of the tubular portion 41 of the headrest support 40 and the inner surface 31 on the upper rear side of the support bracket 30. In the headrest supporting structure of the present embodiment, the stiffness of the upper spring 54A located at the front side of the seat and the stiffness of the upper spring 54A located at the rear side of the seat are the same.

With the above-described headrest supporting structure, by setting the stiffness of the upper springs 54A to be higher than the stiffness of the first and second urging portions 531, 532, the center of tilting A of the headrest stay 21 can be set at a position more distant from the stopper sections 55 than the center position B between the lower spring 53A and the upper springs 54A in the seat vertical direction. Thus, in the headrest supporting structure of the present embodiment, the upper springs 54A correspond to the first spring, and the lower spring 53A, which includes the first and second urging portions 531, 532, corresponds to the second spring.

In the headrest supporting structure as described above, when the headrest stays 21 and the headrest supports 40 tilt such that the headrest 20 is displaced toward the front of the seat, the stopper section 55 that is located on the lower rear side of each headrest support 40 abuts against the inner surface 31 on the lower rear side of the associated support bracket 30. This restricts further displacement of the headrest 20 toward the front of the seat. In contrast, when the headrest stays 21 and the headrest supports 40 tilt such that the headrest 20 is displaced toward the rear of the seat, the stopper section 55 that is located on the lower front side of each headrest support 40 abuts against the inner surface 31 on the lower front side of the associated support bracket 30. This restricts further displacement of the headrest 20 toward the rear of the seat. That is, a range from the position of the headrest 20 when the stopper section 55 on the lower rear side of the headrest support 40 abuts against the support bracket 30 to the position of the headrest 20 when the stopper section 55 on the lower front side of the headrest support 40 abuts against the support bracket 30 corresponds to the pivot range of the headrest 20.

In the headrest supporting structure of the present embodiment, the frequency of vibration that can be attenuated can be set to substantially the same level as the case with the headrest supporting structure of the first embodiment by appropriately setting the stiffnesses of the springs 53A, 54A. For example, the stiffness of the first and second urging portions 531, 532 is preferably set to half the stiffness of the lower spring 53 of the first embodiment, and the stiffness of the upper springs 54A is preferably set to half the stiffness of the upper spring 54 of the first embodiment.

With this configuration, the headrest supporting structure of the present embodiment has the same advantage as the above-described headrest supporting structure of the first embodiment.

The above embodiments may be modified to the embodiments described below.

In each of the embodiments, if the above-described center of tilting A can be set upward of the seat from the center between the lower springs 53, 53A and the upper springs 54, 54A, the stiffnesses of the lower springs 53, 53A and the upper springs 54, 54A may be changed as required.

Figure 8:
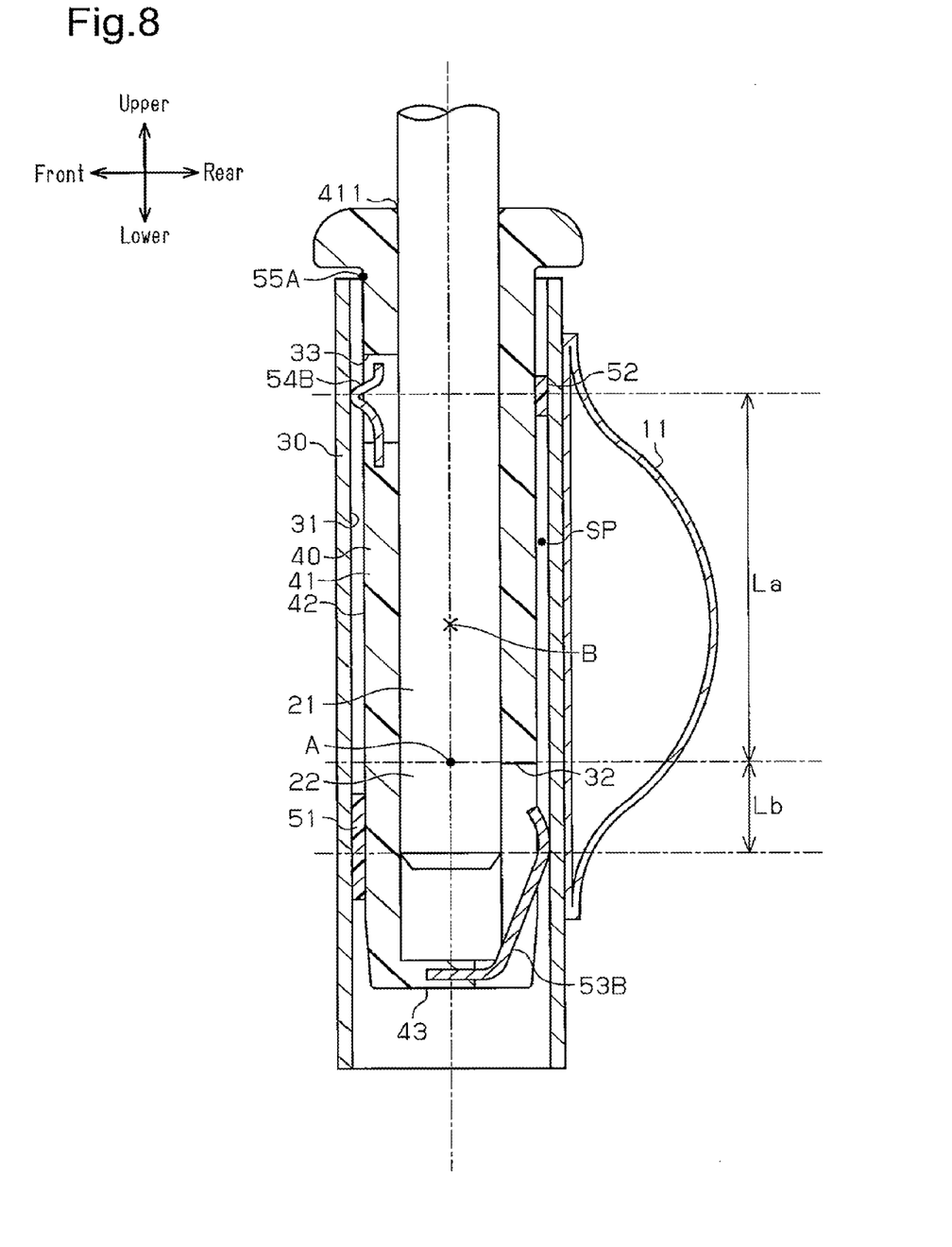
FIG. 8 is a cross-sectional side view of a headrest support and the surroundings in the headrest supporting structure of a modified embodiment.
Figure 9:
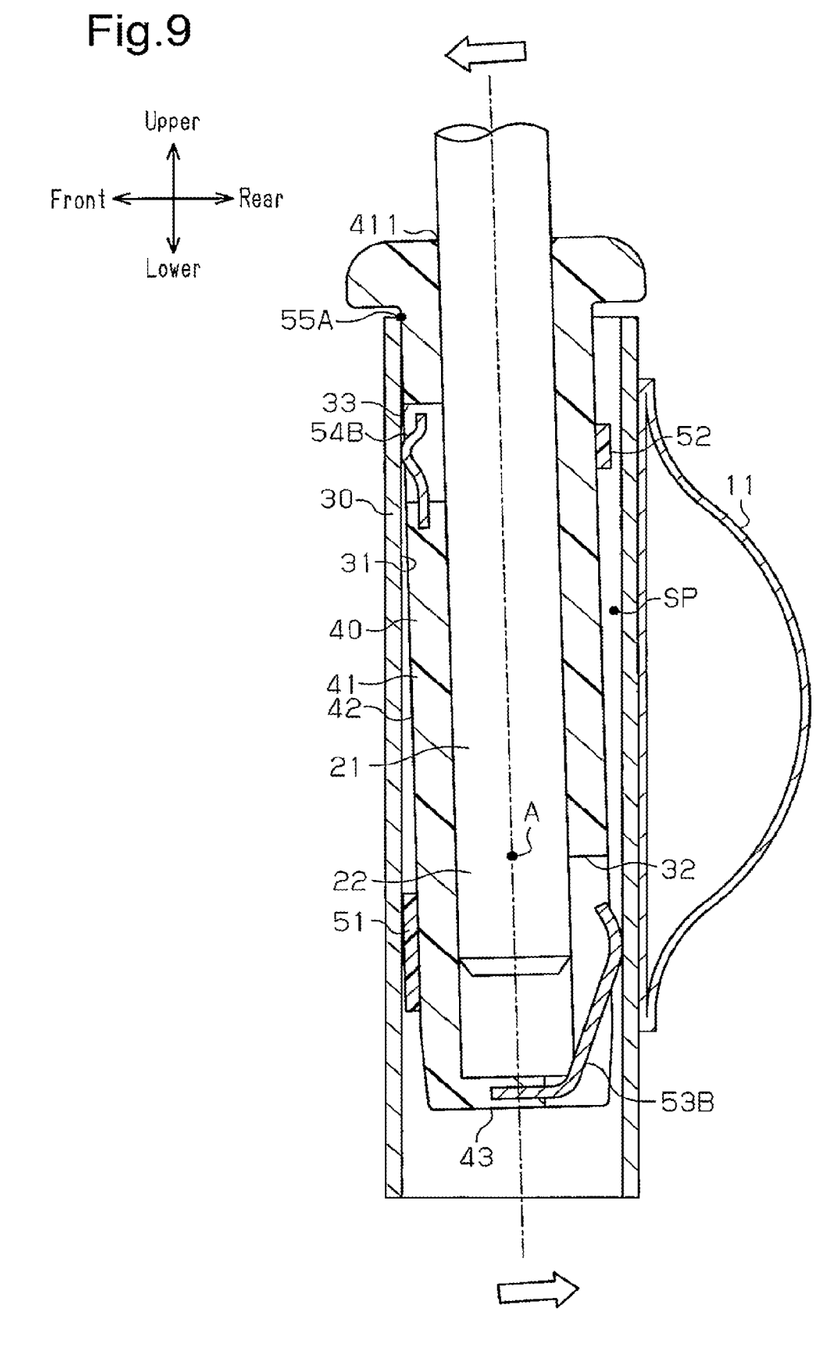
FIG. 9 is a cross-sectional side view of the headrest support and the surroundings in the headrest supporting structure of the modified embodiment when the headrest is displaced toward the front of the seat.

The headrest supporting structure may be formed to restrict pivoting of the headrest 20 in the front-rear direction by the upper section of the headrest support 40. That is, as shown in FIGS. 8 and 9, a stopper section 55A may be provided on the upper front side of the headrest support 40, and the stiffness of an upper spring 54B arranged in the vicinity of the stopper section 55A may be less than the stiffness of a lower spring 53B arranged apart from the stopper section 55A. In this case, the center of tilting A of the headrest stay 21 is set at a position more distant from the stopper section 55A, that is, at the position more distant from the headrest 20 than the center position B between the springs 53B, 54B. Thus, the same advantage as the above-described embodiments is obtained. In this case, the lower spring 53B corresponds to the first spring, and the upper spring 54B corresponds to the second spring.

The spring may be a spring other than the metal leaf spring if the spring expands and contracts (elastically deforms) in accordance with tilting of the headrest stay 21. For example, the spring may be formed by bending part of the headrest support 40, or may be a coil spring.

If the headrest stays 21 project from the headrest 20, the headrest stays 21 do not necessarily have to be bar shaped, but may have any shape such as a rectangular plate shape.

The number of the headrest stays 21, which project from the headrest 20, may be any number other than two (for example, one or three) if the headrest 20 can be mounted on the backrest 10.

DESCRIPTION OF THE REFERENCE NUMERALS

10 . . . backrest, 20 . . . headrest, 21 . . . headrest stay, 30 . . . support bracket, 40 . . . headrest support, which serves as support member, 41 . . . tubular portion, 53, 53A . . . lower spring, which serves as second spring, 53B . . . lower spring, which serves as first spring, 54, 54A . . . upper spring, which serves as first spring, 54B . . . upper spring, which serves as second spring, 55, 55A . . . stopper section, A . . . center of tilting.

The invention claimed is:

1. A headrest supporting structure that supports a headrest on a backrest such that the headrest is capable of pivoting in a front or rear direction, the structure comprising:
    a bracket provided in the backrest;
    a first spring and a second spring located at two positions different from each other in a seat vertical direction, wherein the first spring and the second spring elastically support a headrest stay, which projects from the headrest, with respect to the bracket; and
    a stopper section, which is displaced in the front or rear direction in accordance with pivoting of the headrest, wherein the stopper section restricts further pivoting of the headrest when abutting against the bracket, wherein
    the first spring is more distant from the stopper section than the second spring in the seat vertical direction, and
    a stiffness of the first spring is higher than a stiffness of the second spring.

2. The headrest supporting structure according to claim 1, further comprising:
    a support member including a tubular portion in which the headrest stay is inserted, the support member supporting the headrest stay inserted in the tubular portion, wherein
    the stopper section is provided in the support member,
    the bracket is configured to elastically support the headrest stay via the support member, and
    the first spring expands and contracts in accordance with displacement of the support member with respect to the bracket.

3. The headrest supporting structure according to claim 1, wherein the stopper section is located at a position more distant from the headrest in the seat vertical direction than the springs.

* * * * *